W. G. WALTON.
LOCK FOR THE STEERING GEAR OF MOTOR VEHICLES.
APPLICATION FILED JAN. 12, 1915.
1,145,281.
Patented July 6, 1915.
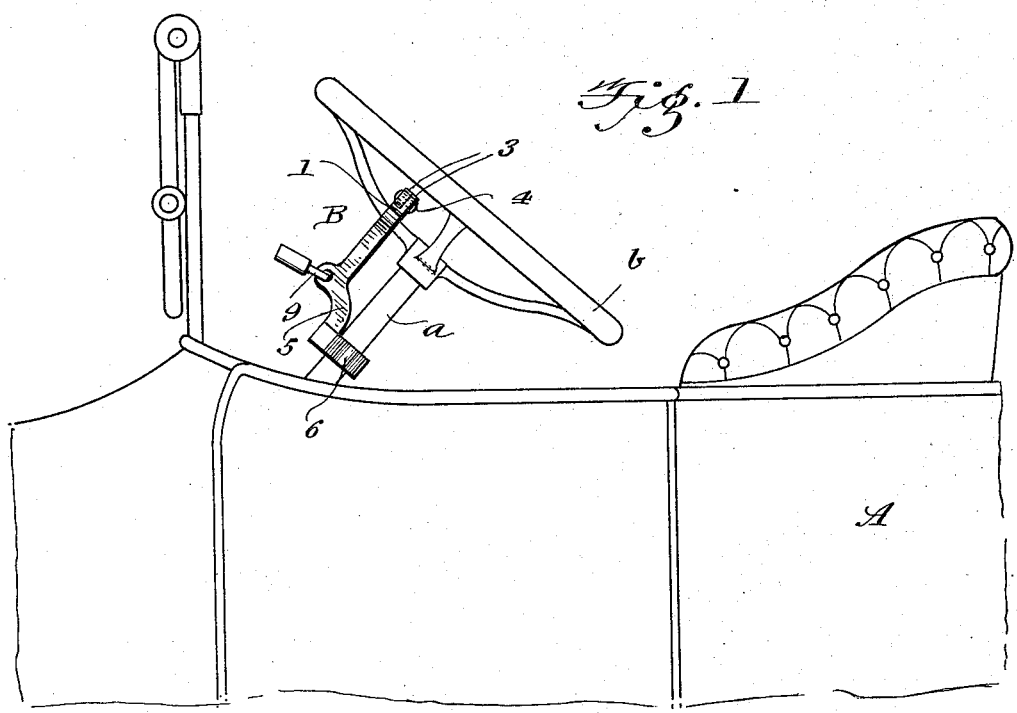
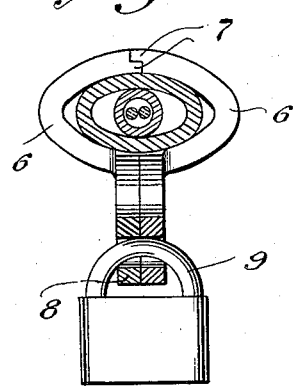
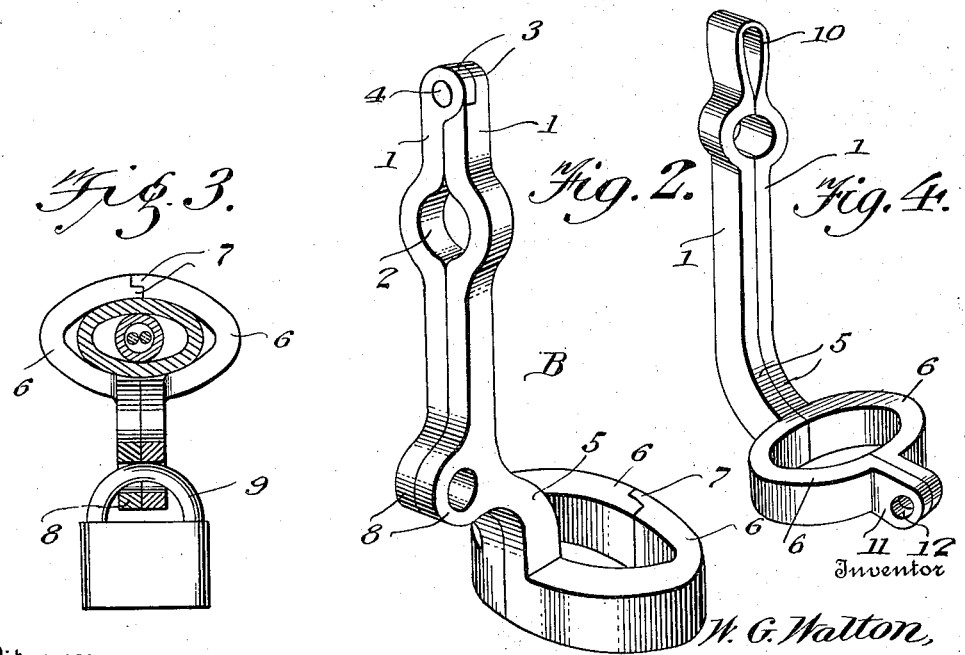
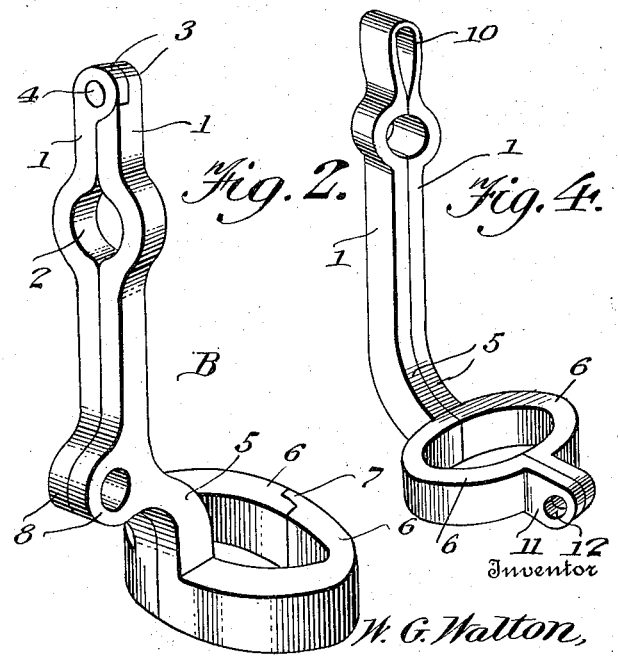

UNITED STATES PATENT OFFICE.

WILLIAM G. WALTON, OF PHILADELPHIA, PENNSYLVANIA.

LOCK FOR THE STEERING-GEAR OF MOTOR-VEHICLES.

1,145,281. Specification of Letters Patent. Patented July 6, 1915.

Application filed January 12, 1915. Serial No. 1,815.

*To all whom it may concern:*

Be it known that I, WILLIAM G. WALTON, a citizen of the United States of America, residing at Philadelphia, in the county of Philadelphia and State of Pennsylvania, have invented new and useful Improvements in Locks for the Steering-Gear of Motor-Vehicles, of which the following is a specification.

This invention relates to improvements in steering gear locks for motor vehicles, and has particular application to a device for locking the steering wheel to the stationary sleeve or tube surrounding the steering post.

In carrying out the present invention, it is my purpose to provide a lock of the type set forth whereby the steering wheel may be locked against turning movement so as to prevent theft of the machine and wherein the parts of the lock will be so correlated and arranged as to enable the lock to be readily applied to the steering wheel and removed therefrom.

It is also my purpose to improve and simplify the general construction of steering gear locking devices and to provide a lock which may be manufactured at a minimum expense.

With the above and other objects in view, the invention consists in the construction, combination and arrangement of parts hereinafter set forth in and falling within the scope of the claim.

In the accompanying drawings; Figure 1 is a fragmentary side elevation of the motor vehicle, showing my improved locking device applied to the steering wheel thereof; Fig. 2 is a perspective view of the lock removed from the vehicle; Fig. 3 is a cross sectional view through the steering column and lock thereon; and Fig. 4 is a perspective view showing a modified form of locking device.

Referring now to the drawings in detail, A designates the body of a motor vehicle of suitable construction equipped as is usual with a steering column $a$ and steering wheel $b$ at the upper end of the column and fixed to the steering post whereby the front wheels of the vehicle may be turned in one direction or another to facilitate the steering of the vehicle.

My improved locking device is designated as an entirety at B and comprises complementary sections 1, 1 placed in edge to edge contact and having the confronting edges thereof formed with grooves 2 respectively coöperating with each other to form a recess adapted to receive one of the spokes of the steering wheel. In the present instance, the grooves 2 are formed by bowing the respective sections 1, 1 outwardly and these grooves are disposed adjacent to one end of the device. Formed on the end of each section 1 adjacent to the groove 2 therein is a pivot knuckle 3 alining with the pivot knuckle on the other section and passed through these alining pivot knuckles is a pivot bolt 4 whereby the sections 1, 1 may be swung relatively to each other to open and closed positions. In this instance, the remaining extremities of the sections 1, 1 are offset, as at 5 so that the rear edges thereof will lie upon the steering column $a$, as illustrated in Fig. 1 of the drawing, and formed integral with the outer edges of the offset portions 5 of the respective sections 1 are semi-oval-shaped sections 6 having the meeting ends thereof formed with interfitting tongues 7. These sections 6, 6 coöperate to form an oval-shaped clamp designed to encircle and frictionally engage a steering column of similar shape in cross section, as clearly illustrated in Fig. 3.

In order to lock the sections 1, 1 in edge to edge contact so as to prevent movement of the sections to open position by unauthorized persons, suitable means is employed. In this form of my invention the forward edges of the sections 1 at the juncture of the offset portions 5 with the main body portion of such sections, are formed with outwardly projecting lugs 8 provided with alining openings designed to receive the hasp of a pad lock 9.

In practice, when it is desired to lock the steering wheel against turning movement, the sections 1 are swung to open position and slipped over one of the spokes of the steering wheel and then swung to closed position to seat one of the spokes in the coöperating grooves 2 and engage the sections 6 of the clamp with the sleeve surrounding the steering post. In the swinging movement of the sections 1 to closed position, the openings in the lugs 8 are brought into axial alinement and the hasp of the pad lock 9 is now slipped through these alining openings and latched thereby holding the sections of the lock against movement to open position. In the use of the lock the oval-shaped clamp formed by the sections 6 encircles and frictionally engages the steering column, and, owing to the shape of the steering column and the shape of the clamp, prevents relative movement between the clamp and column.

In the modified construction illustrated in Fig. 4, the upper extremities of the sections 1, 1 above the bowed portions forming the grooves 2 are connected to each other through the medium of a spring wheel yoke 10 that acts to hold the confronting faces of the sections 1, 1 normally in contact with each other. In the present instance, this yoke 10 is formed integral with the upper ends of the sections 1, 1. In this form of the invention, the meeting ends of the curved sections 6, 6 are formed with outwardly projecting lugs 11, corresponding to the lugs 8 in the preferred form of the invention, and formed with alining openings 12 to receive the hasp of the lock 9 so that the sections of the locking device may be locked in closed position. In the use of the device shown in Fig. 4, the sections 1, 1 are moved out of engagement with each other against the action of the spring yoke 10 and the device applied to the steering wheel and column as previously described with reference to Fig. 1. After the device is applied the sections are released and the spring yoke 10 reacts to restore the same to normal closed position. The lock 9 is now applied to the lugs 11 and the device held securely upon the steering column.

While I have herein shown and described the clamping ring as oval-shaped and illustrated the device as applied to a steering column of oval shape in cross section I wish it to be understood that the clamping rings may be of other cross sectional shape.

I claim:

A lock for the steering wheels of motor vehicles comprising complementary sections placed in edge to edge contact and having the confronting edges thereof formed with coacting grooves to receive one of the spokes of the steering wheel, means connecting said sections at one end of the lock for relative movement, the remaining extremities of said sections being offset to lie against the steering columns and ring forming sections formed integral with the offset portions of said first sections and disposed in a plane at right angles to said first sections to encircle the steering column, and means for locking said sections in ring formation.

In testimony whereof I affix my signature in presence of two witnesses.

WILLIAM G. WALTON.

Witnesses:
V. R. S. WALTON,
OLIVER O'DONNELL.

Copies of this patent may be obtained for five cents each, by addressing the "Commissioner of Patents, Washington, D. C."